United States Patent
Blanford et al.

(10) Patent No.: US 7,197,837 B1
(45) Date of Patent: Apr. 3, 2007

(54) GAUGE ASSEMBLY FOR MEASURING DIAMETER AND TOTAL INDICATED RUNOUT

(75) Inventors: William C. Blanford, Sidney, OH (US); Dale Grieshop, Troy, OH (US)

(73) Assignee: Honda Motor Co., Ltd., Tokyo (JP)

( * ) Notice: Subject to any disclaimer, the term of this patent is extended or adjusted under 35 U.S.C. 154(b) by 148 days.

(21) Appl. No.: 11/081,693

(22) Filed: Mar. 15, 2005

(51) Int. Cl.
G01B 3/00 (2006.01)
(52) U.S. Cl. .................................. 33/555.1; 33/558.01
(58) Field of Classification Search .............. 33/555.1, 33/546, 551, 558.01, 558.02, 519
See application file for complete search history.

(56) References Cited

U.S. PATENT DOCUMENTS

| | | | |
|---|---|---|---|
| 1,515,034 A | 11/1924 | Griswold | |
| 2,872,819 A | 2/1959 | King | |
| 2,919,581 A | 1/1960 | Lash | |
| 2,942,526 A | 6/1960 | Maecker | |
| 4,300,197 A | 11/1981 | Schonfeld et al. | |
| 4,416,130 A | 11/1983 | Judge, Jr. | |
| 4,446,732 A | 5/1984 | Schoenfeld | |
| 4,646,570 A | 3/1987 | Schoenfeld | |
| 5,131,143 A | 7/1992 | Kirchberger | |
| 5,150,545 A * | 9/1992 | Esteve | 33/555.1 |
| 5,508,944 A | 4/1996 | Danielli | |
| 6,286,223 B1 * | 9/2001 | Iwamoto | 33/555.1 |
| 6,324,902 B1 | 12/2001 | Kang | |
| 6,408,663 B1 | 6/2002 | Pickren | |
| 6,421,929 B1 * | 7/2002 | Keefe | 33/551 |
| 6,631,640 B2 | 10/2003 | Miura | |
| 2003/0230142 A1 | 12/2003 | Tamura et al. | |

* cited by examiner

Primary Examiner—Yaritza Guadalupe-McCall
(74) Attorney, Agent, or Firm—Rankin, Hill, Porter & Clark LLP; Vincent Ciamacco

(57) ABSTRACT

The invention is directed to a gauge assembly that is used to measure parameters of camshaft journals or other objects with cylindrical surfaces. The gauge assembly includes two gauges, the first is an air snap gauge and the second a linear variable differential transducer. The air snap gauge is slidingly attached to the base and the second gauge is attached to a base as well. Air resistance measurements, taken through the air snap gauge provide a measure of diameter of the journal while relative linear motion between the base and air snap gauge, measured by the second gauge, provides a measure of journal runout relative to the center axis of the camshaft. Control logic is used to calculate other parameters such as runout of a journal relative to another journal on a common camshaft.

13 Claims, 4 Drawing Sheets

US 7,197,837 B1

GAUGE ASSEMBLY FOR MEASURING DIAMETER AND TOTAL INDICATED RUNOUT

BACKGROUND OF THE INVENTION

Meeting camshaft design specification within an engine is critical in order to provide proper operation of the apparatus driven by that engine. Thus, each manufactured camshaft is tested to make sure critical dimensions are within a desired tolerance. The camshaft journals (round portions of the camshafts located between the cams, are typically checked for proper diameter, roundness and runout (the amount the journal deviates from the camshaft axis or another reference when rotated).

Commonly, the diameter of the journal is measured using an air snap gauge. This gauge includes two arms, each with a straight section and an inwardly angling section, that extend along either side of the journal. The snap guage is advanced over the journal until the journal contacts a pad on the inner side of the inwardly angling section of each arm. When the journal contacts the two pads, slits on the straight section of each arm, are aligned on diametrically opposite side of the journal. By measuring the air resistance encountered as a jet of air is blown through each slit, a reading is obtained that can be used to calculate the journal's diameter.

Alternatively, the diameter is measured by two individual transducer pointer style contact gauges that are precisely positioned on diametrically opposite sides of the journal. Drawbacks to the existing measuring process using the two pointer gauges for measuring diameter are: 1) The pointer contacts must be precisely placed on the journal centerline to achieve repeatable results. This is difficult to do because pointer gauge location is controlled by an advance/retraction system mounted to a machine table (as opposed to the air gauge position that is controlled by resting (in a datum condition) on the actual journal being measured). 2) The accuracy of the pointer gauges is susceptible to variations in the ambient temperature. 3) Two transducers must be used to measure diameter rather than one (as with an air gauge). This introduces twice the error potential from calibration of each gauge.

Unfortunately, an air snap gauge cannot be used to measure runout because of the basic design of the gauge. One of the reasons the air snap gauge is very accurate is because it rests (datum condition) on the journal being measured, thus, keeping the air gap consistent between the two arms of the gauge and the journals. As the part is rotated, the air snap gauge will move with the part keeping the air gap between the arms and the journals consistent. Since the air gap is consistent and doesn't vary with the rotation, the air resistance measured by the gauge doesn't change with the part rotation. Thus, meaningful runout measurements readings cannot be obtained with the air snap gauge.

Runout may be measured manually using a single pointer gauge, positioned differently from the two pointer gauges used to measure diameter. The single pointer gauge is brought into contact with the journal and then read as the camshaft is rotated between centers. Typically, the camshaft is placed on a table stand, the pointer gauge manually aligned, and then runout measurements are made.

As a result, the diameter and runout are conventionally measured in two separate steps, often at two different locations, which increases the time of the overall measuring process. Therefore, there exists a need in the art for an assembly that can measure journal size, roundness, and runout, and for such an assembly that can be easily set up.

SUMMARY OF THE INVENTION

The present invention overcomes these and other disadvantages in the prior art. The present invention provides a single device that can measure both the diameter and runout on an article having a cylindrical surface, such as a camshaft journal, in a short period of time. Like a traditional air snap gauge, the gauge is simply advanced into place on the camshaft journals; precision manual alignment is not required.

In accordance with the present invention, the gauge assembly includes first and second gauges. The first gauge includes first and second spaced arms and two air passages for use in measuring the diameter of a body with a generally cylindrical surface. The gauge assembly also includes a neck portion adjacent to and pivotally attached to the first gauge. The gauge assembly also includes a base movable with respect to the neck portion. A second gauge is affixed to the base and contacts the neck portion for measuring the relative linear motion therebetween.

The gauge assembly may be used to measure, on a camshaft or other body with a cylindrical exterior, the diameter, roundness and runout of journals, oil seals, pulleys and/or other round similar members. The first gauge is able to measure the diameter of the body. The second gauge measures linear relative movement between the neck portion and base, which is indicative of the runout of the cylindrical body.

These and other aspects of the invention are herein described in particularized detail with reference to the accompanying figures.

DETAILED DESCRIPTION OF THE INVENTION

Figure 1:
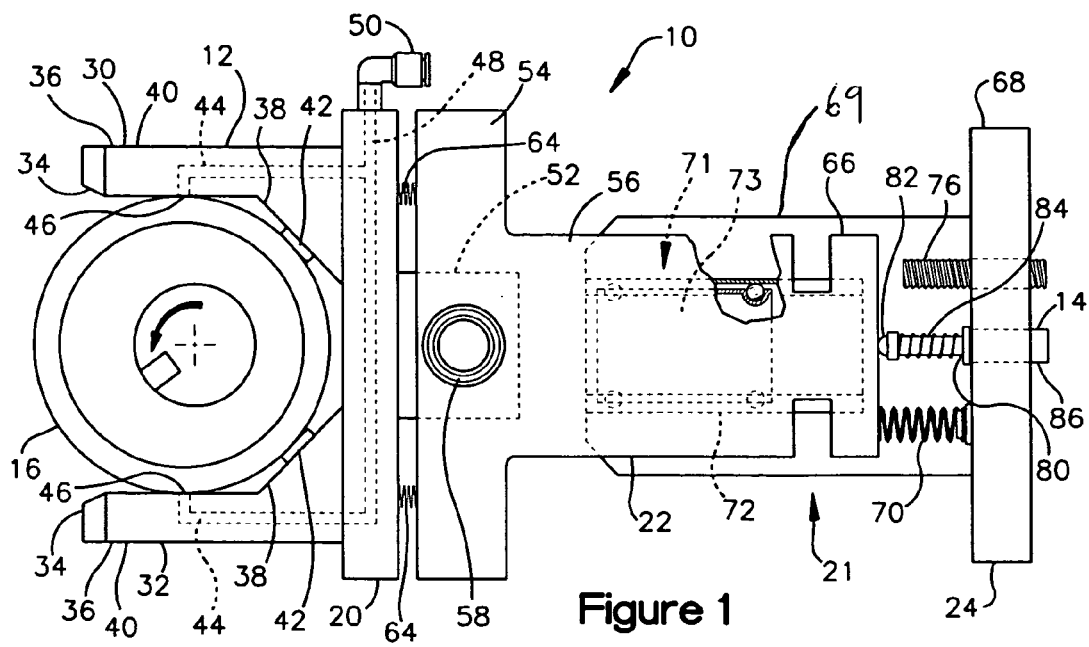
FIG. 1 is a side elevational view of a gauge assembly of the present invention.
Figure 5:
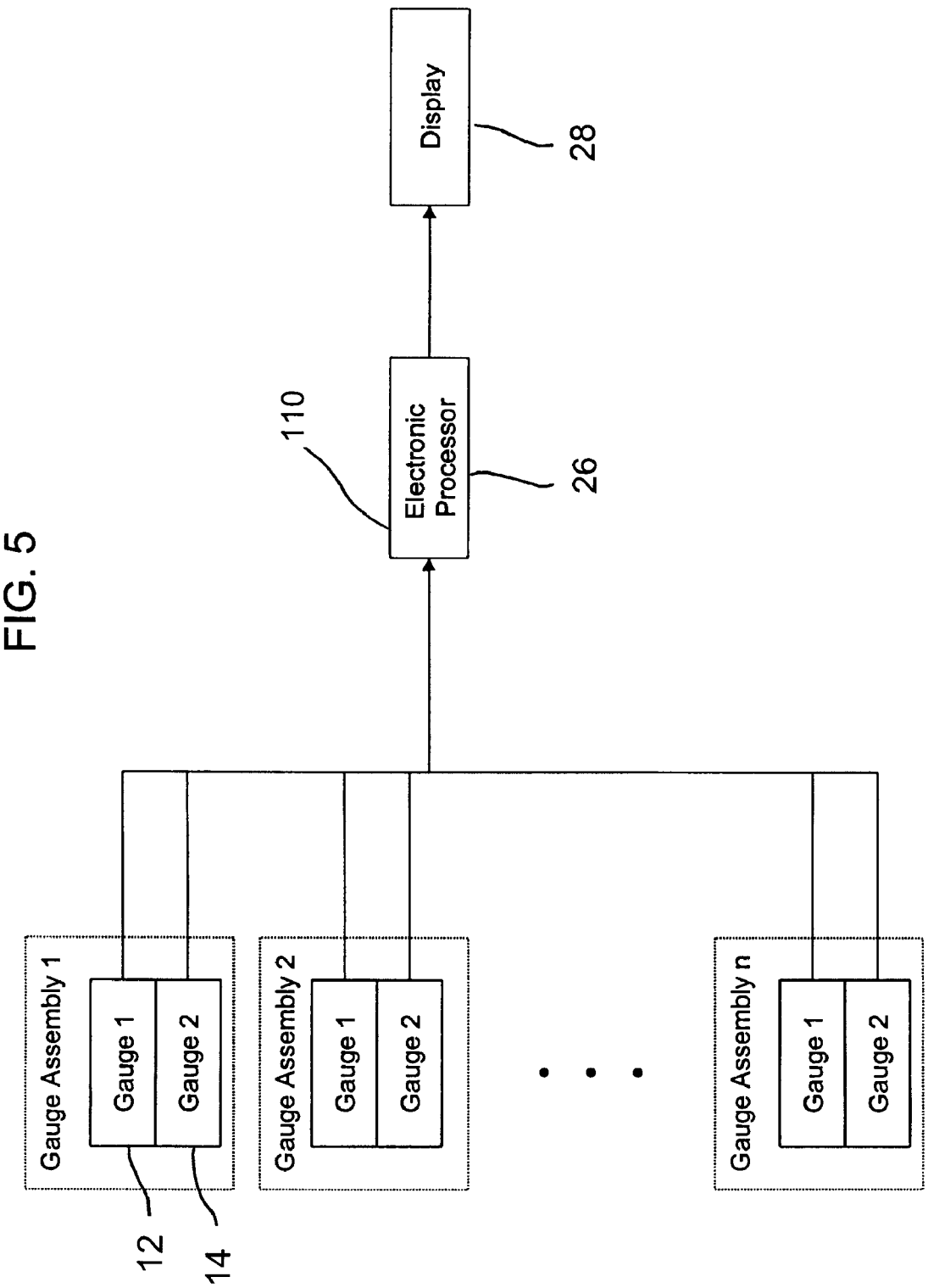
FIG. 5 is a schematic representation of data transfer within the testing setup.

Referring to the drawings, specifically FIGS. 1 and 5, a preferred gauge assembly 10 for measuring diameter, roundness, and Total Indicated Runout (TIR) according to the present invention is illustrated. The gauge assembly 10 includes first and second gauges 12 and 14, the first gauge 12 for measuring the diameter of a generally cylindrical body 16 and the second gauge 14 for measuring TIR of the generally cylindrical body 16, such as the generally cylindrical journals on a camshaft. As described in more detail below, the first gauge 12 includes first and second arms 30 and 32 and a generally rectangular plate 20. The gauge assembly 10 also includes an interconnecting structure 21 for securing the first and second gauges 12, 14 together, the interconnecting structure including a neck portion 22 and base 24. The second gauge 14 is affixed to the base 24 and measures linear movement between the neck portion 22 and the base 24. Also described in more detail below, readings made by the first and second gauges 12 and 14 are fed to an electronic processor 26 that calculates roundness, TIR expressed in relation to the camshaft center, and TIR of a particular journal in relation to one or more journals on a common camshaft. Results of the calculations are shown on a display device 28.

Referring to FIG. 1, the first gauge 12 has, in general, a forked configuration and includes first and second arms 30 and 32 extending from the rectangular plate 20. The first and second arms 30 and 32 are spaced and include a proximal end at the rectangular plate and an opposite, distal end. The distal end includes a beveled, wear-resistant, surface 34 on an inner side to guide a cylindrical part between the first and second arms 30, 32. Adjacent to the distal end, each arm has a straight section 36 with a generally rectangular cross-sectional shape that remains consistent. Approximately two-thirds of the way from the distal end to the proximal end, each arm expands in width. An inner wall 38 (wall closest to the opposite arm) of the arm extends diagonally inward. The outer wall 40 of the arm maintains a line generally perpendicular to the rectangular plate 20. The arms 30 and 32 are spaced at their proximal ends. A contact pad 42 made of a wear resistant material is placed on the interior arm wall 38 in the inwardly extending section.

Each arm 30 and 32 has an air passage 44 formed therein. Each air passage 44 communicates with a narrow slit 46 on the inner wall of the straight section 36 of the arm. Preferably, each air passage 44 proceeds along the length of each arm 30, 32 and into the rectangular plate 20 that acts as a manifold. Within the rectangular plate 20 each air passage 44 joins with another air passage 48, transversely oriented, and a combined air passage is formed that terminates on a side surface of the rectangular plate 20. The first gauge 12 may be a common air snap gauge, such as the gauge manufactured by Precision Gauges of Dayton, Ohio.

The rectangular plate 20 extends perpendicularly to the length of the first and second arms 30 and 32. The rectangular plate 20 may be integrally formed with the first and second arms 30 and 32 or affixed thereto. As previously stated, the rectangular plate 20 acts as a manifold and provides the combined air passage 48 therethrough that is in fluid communication with the two air passages 44 in the first and second arms 30 and 32. A pneumatic fitting 50 is attached to an exterior sidewall of the rectangular plate 20 at the terminus of the combined air passage 48. On the side opposite the first and second arms 30 and 32, a boss 52 extends outwardly and connects the rectangular plate 20 to the neck portion 22 as described below.

The neck portion 22 has a T-shape including a top section 54 and a stem section 56. The neck portion 22 is on the opposite side of the rectangular plate 20 from the first and second arms 30 and 32. The stem section 56 extends, generally perpendicular to the rectangular plate 20 and generally parallel to the length of the first and second arms 30 and 32.

Figure 2A:
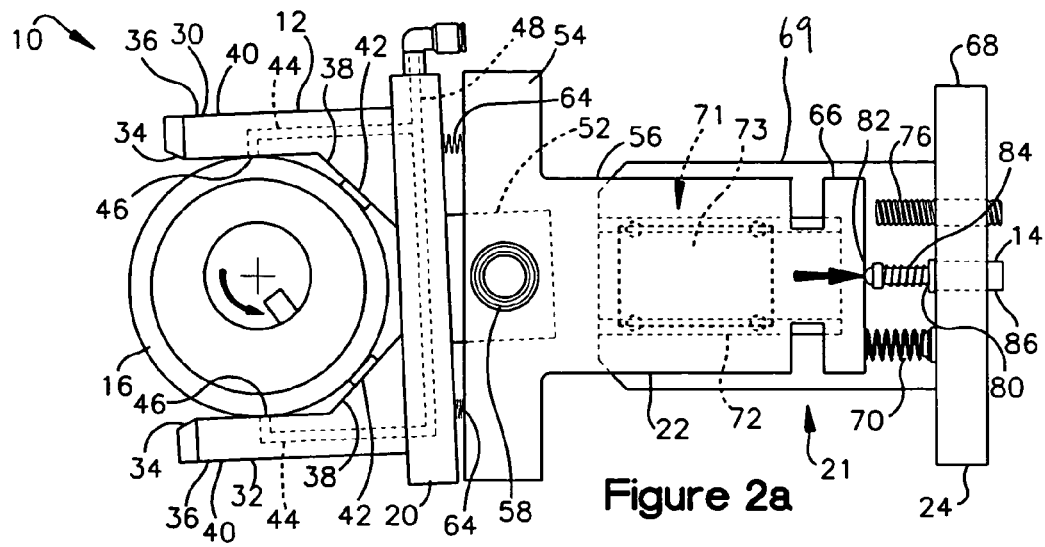
FIG. 2a is a side elevational view of the gauge assembly of the present invention in a first operable position.
Figure 2B:
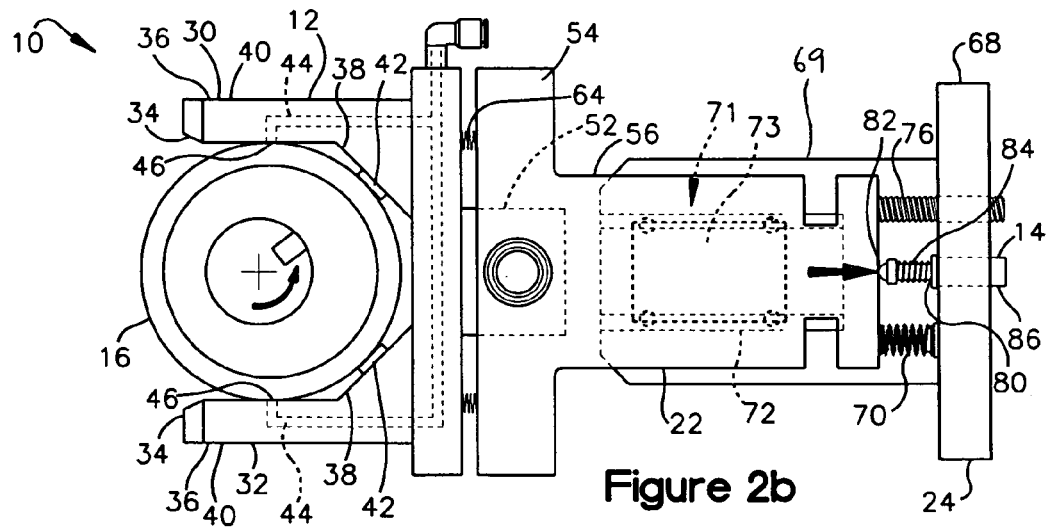
FIG. 2b is a side elevational view of the gauge assembly of the present invention in a second operable position.
Figure 2C:
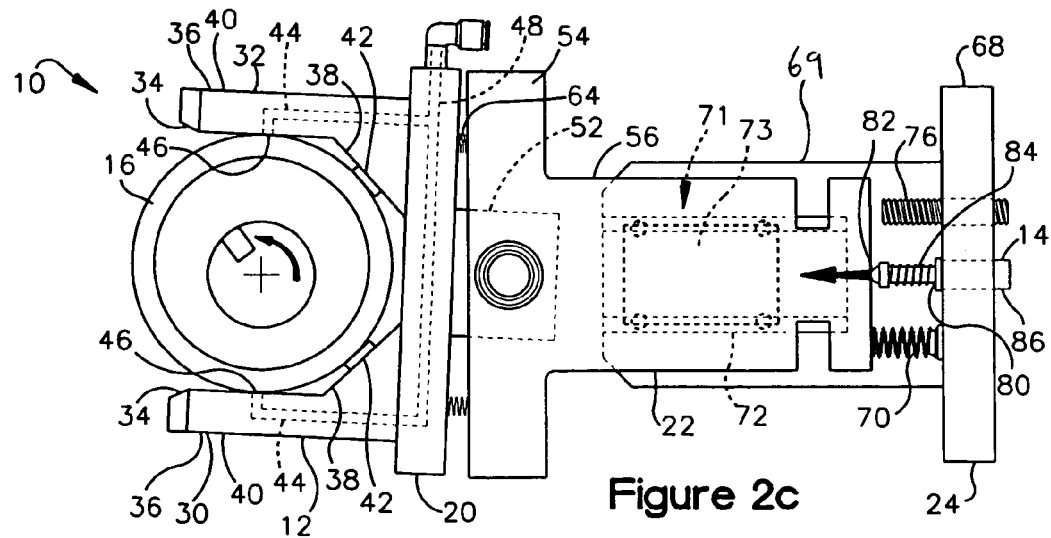
FIG. 2c is a side elevational view of the gauge assembly of the present invention in a third operable position.

A pivot bearing 58 extends through the center of the top section 54 of the neck portion 22 adjacent to the rectangular plate 20. The pivot bearing 58 pivotally secures the neck portion 22 to the boss 52 extending from the rectangular plate 20. The neck portion 22 is spaced apart from the rectangular plate 20 by two spring members 64. As a result, the first gauge 12 pivots with respect to the neck portion 22 (as shown in FIGS. 2a–2c). The first gauge 12 and neck portion 22 are spaced equally from one another when a pivoting force is removed (FIG. 2b). The force of the spring members 64 also assists in keeping the pads 42 of the first gauge 12 in contact with the cylindrical object 16 being measured. Referring back to FIG. 1, the neck portion 22 also includes a flange 66 integrally formed with the stem section 56.

The base 24 is a generally rectangular solid having a width generally equivalent to the width of the stem section 56. The base 24 includes a flanged section 68 thicker and wider than the remainder of the base 24. The flanged section 68 has holes (not shown) to facilitate attachment of the gauge assembly 10 to a support carriage, described further below. The base 24 further includes an arm section 69 integrally formed and adjacent to the flanged section 68. The base flanged section 68 is spaced apart from the neck portion 22 and is secured thereto by a biasing device 70, preferably a spring, as illustrated. The spring 70 is configured to bias the neck portion 22 apart from the base 24. The spring 70 is held in place by nubs extending from both the neck portion 22 and flanged section 68.

A ball bearing linear slide 71 facilitates movement between the base 24 and neck portion 22. The linear slide 71 has an outer race 72 affixed to the neck portion 22 and an inner race 73 affixed to the arm section 69 of the base 24. A stop 76 threadingly attached to the flanged section 68 limits the movement of the neck portion 22 toward the base flanged section 68.

The second gauge 14 is a linear variable differential transducer (LVDT) that includes a plunger section 84 and a cylinder section 86 that move relative to each other. A first end 80 of the plunger section 84 enters the cylinder section 86 while a second, opposite end 82 of the plunger section 84 is affixed to or abuts the neck portion 22. Preferably, the plunger section 84 is spring biased in a manner that keeps the second end 82 in contact with the neck portion 22. The cylinder section 86 of the second gauge 14 passes through and is affixed to the flanged section 68 of the base 24. The second gauge 14 is configured to detect relative movement between the base 24 and neck portion 22, the movement being oriented in a direction perpendicular to the width of the base 24 and neck portion 22.

Figure 3:
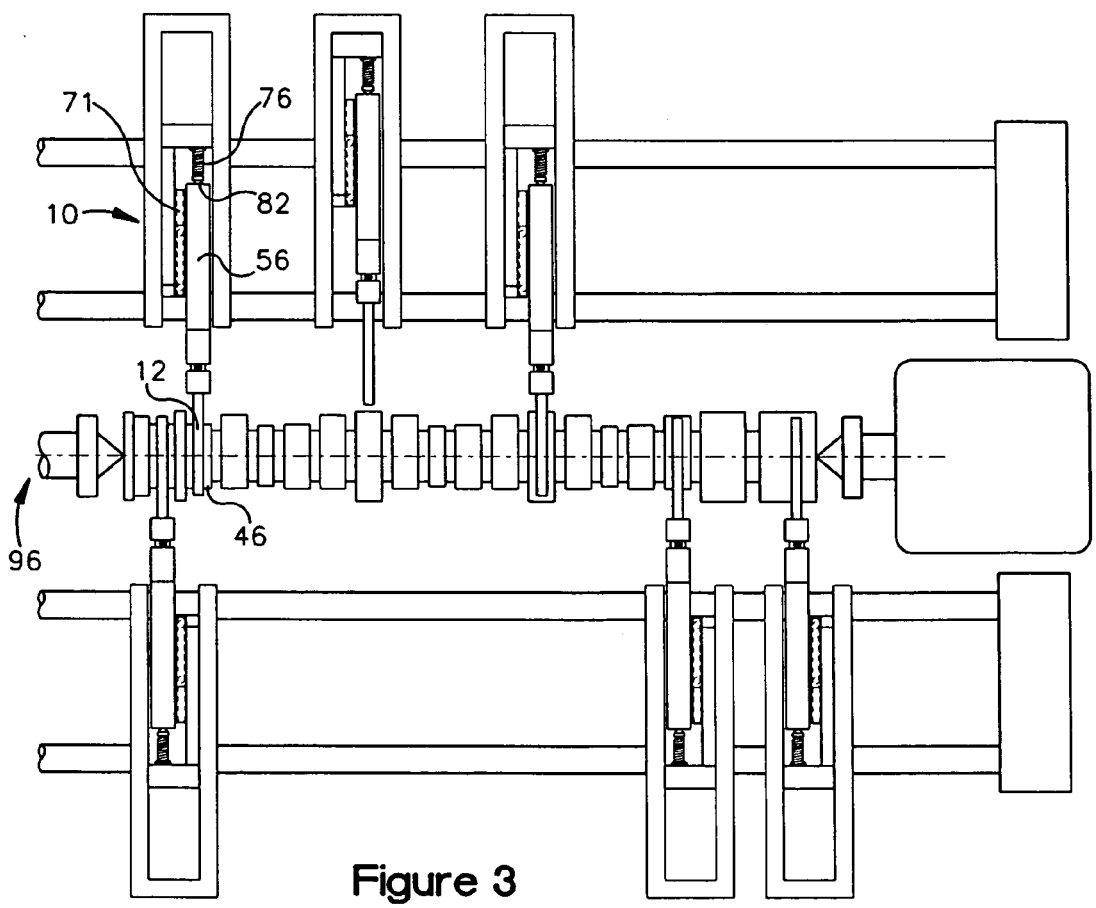
FIG. 3 is a top view of a measuring apparatus according to the present invention.
Figure 4:
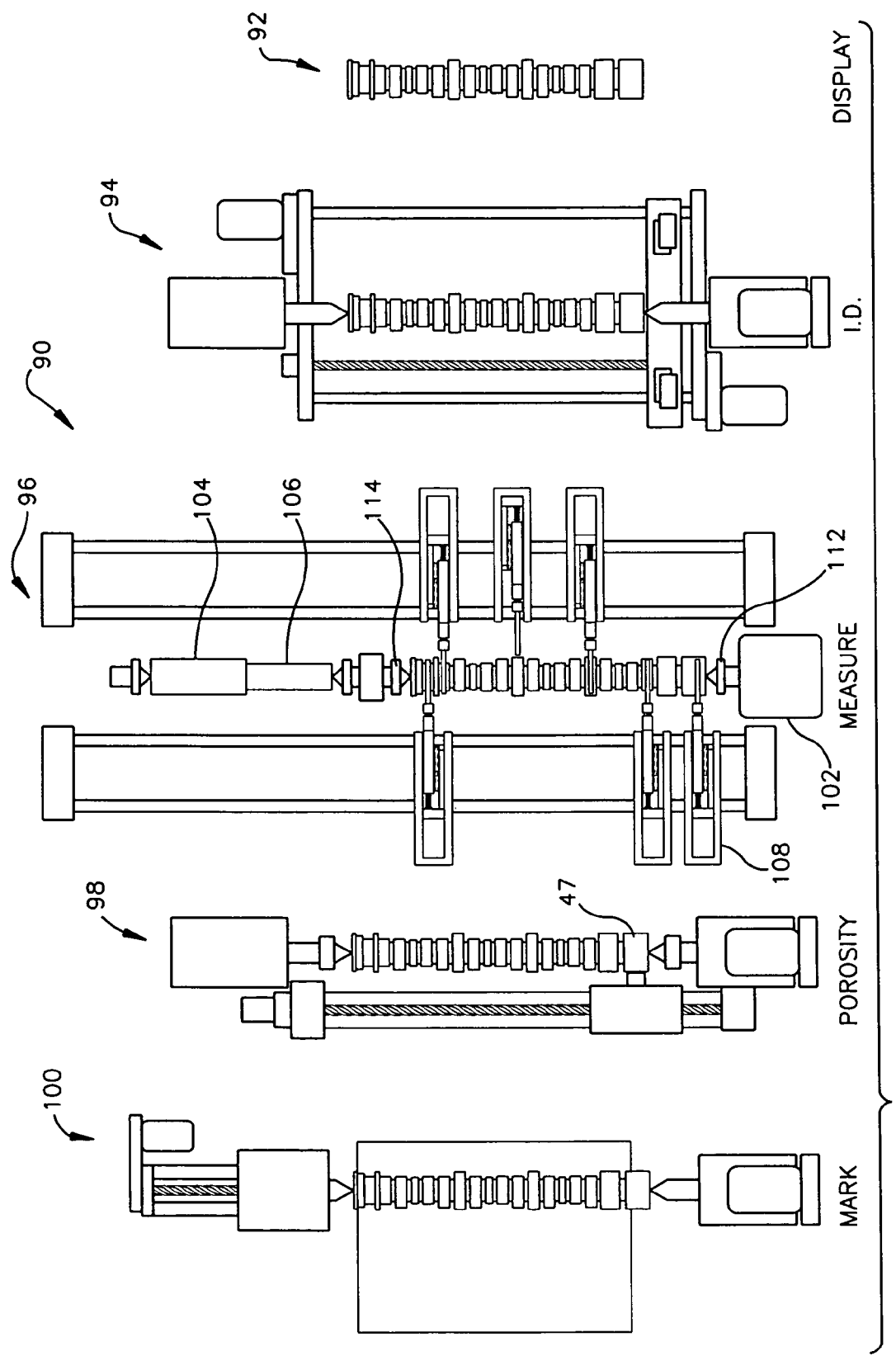
FIG. 4 is a top view of a testing setup utilizing the measuring apparatus of FIG. 3.

Referring to FIGS. 3–5, a plurality of the aforementioned gauge assemblies 10 are used as part of a testing setup 90 within a factory setting. It will be appreciated that the gauge assemblies 10 are rather schematically illustrated in these Figures. The testing setup 90 typically follows a journal grinding operation. The testing setup 90 preferably includes the following stations: a preliminary holding/display station 92, scanning/identification station 94, measuring station 96, porosity test station 98, and marking station 100. The camshaft 16 is moved from one station to the next using a transfer apparatus that is operable to grasp, lift and transport, the camshafts 16 sequentially between stations. Preferably, a camshaft 16 moves from station to station sequentially in the following order: preliminary holding/display station 92, scanning/identification station 94, measuring station 96, porosity test station 98, and marking station 100. Within the measuring station 96, a camshaft 16 is supported between centers. The measuring station 96 (FIG. 3) includes a plurality of the gauge assemblies 10 of the present invention and measures diameter, roundness and TIR of a plurality of camshaft journals. Depending upon the measurement being made, the camshaft 16 may be rotated by a servo motor 102. The servo motor 102, as compared to other devices that could rotate the camshaft 16, starts up without any jerking motion that could create false TIR readings. Additionally, the amount of rotational movement can be precisely controlled using the servo motor 102.

The measuring station 96 also includes a master shaft 104 that has at least two cylindrical guides 106. The two guides 106 have diameters that correspond to the largest and smallest diameters measurable by the first gauge 12. Periodically, the first gauge 12 on the gauge assembly 10 makes measurements of the cylindrical guides 106 on the master shaft 104 and is calibrated. A display device 28, which preferably is a computer monitor, is located adjacent to the above mentioned stations and displays measured and calculated parameters. In the measuring station 96, each gauge assembly is supported upon a movable support carriage 108 that moves toward and away from a central axis of the camshaft 16 as the camshaft 16 sits in the cradle.

The scanning station 94 optically scans the shape of the camshaft 16 and measures the camshaft 16 length in order to classify the camshaft model being tested. The marking station 100 physically marks each camshaft with the indication that the camshaft has been tested for diameter and runout. An indication of the camshaft type is also placed on the camshaft 16.

Porosity of an oil seal journal 47 on the camshaft 16 is tested at the porosity testing station 98. Two electrodes are brought into contact with the oil seal journal 47 and a measurement of eddy current therethrough is made.

Control logic 110 is a part of an electronic processor 26 and is used to convert air pressure readings made by the first gauge 12 into corresponding electrical readings. Additionally, the control logic 110 uses data from the second gauge 14 to calculate TIR with respect to one or more other journals on the camshaft 16 as described below. The control logic 110 also creates graphical figures that are shown on the display device 28. The control logic 110 takes readings from the scanning station 94 and makes comparisons to a library of known camshafts 16 and generates a match, thus, identifying the camshaft 16 for future reference.

The gauge assembly 10 is used within the measuring station 96 to measure the diameter, roundness, and total indicated runout of an object 16 with a generally cylindrical exterior surface. In the illustrated embodiment, the object is a camshaft 16, specifically the round camshaft journals. Within the testing setup 90, the camshaft 16 is moved into the measuring station 96 and is placed between centers. At this time, the gauge support carriages 108 are in a retracted position so the gauge assemblies 10 do not interfere with the camshaft 16 as the camshaft 16 is moved into place.

Depending upon the number of journals or other cylindrical surfaces on the camshaft 16, an equivalent number of gauge assemblies 10 and support carriages 108 are installed in the measuring station 96. When the camshaft 16 is in the cradle a keyway on the camshaft 16 is found and used as a reference point, and the gauge support carriages 108 are advanced toward the camshaft 16. The support carriage 108 is advanced until the gauge assembly 10 is in a position where the camshaft journal abuts contact pads 42 on an angled portion 38 of the arms of the first gauge 12. The first gauge 12 then measures the diameter of the camshaft journal by measuring resistance encountered by air blown from slits 46 in the arms 30 and 32. This information is sent to control logic 110 within the testing setup 90. At anytime after the camshaft 16 is placed in the load position, a driving spindle 112 and driven spindle 114 are advanced axially toward opposite ends of the camshaft 16. The driving spindle 112 is attached to a servo motor 116 that rotates the spindle 112 and also the camshaft 16 when desired.

After the first measurement of diameter is complete, the driving spindle 112 is actuated in order to rotate the camshaft 16 ninety degrees. The support carriages 108 do not have to be retracted when rotation occurs. After rotation is complete, a second diameter measurement is made and sent to the control logic 110. A calculation of roundness of the journal is made using the two diameter measurements. The driving spindle 112 is then actuated to cause rotation of the camshaft 16 three hundred and sixty degrees. As this rotation occurs, the first gauge arms 30 and 32 and rectangular plate 20 rock in either an upward and backward or downward and backward direction with respect to the neck portion 22 as shown in FIGS. 2a–2c. The linear component of this rocking type motion is transferred to the neck portion 22 which slides back and forth relative to the base arm section 69. This linear movement is measured by the second gauge 14 and information is sent to the control logic 110. Measurement by any single gauge assembly on a single journal will provide an indication of TIR with respect to the center axis of the camshaft 16.

When multiple measurements are made (e.g. TIR readings on each of five journals on a single camshaft), TIR with respect to a journal center can be calculated. Typically the journals at the end of the camshaft (e.g. journal 1 and journal 5) are used as reference journals. An example calculation for TIR with respect to journal 1 and journal 5 is as follows.

$$TIR(j3)=[(TIR(c1)-TIR(c3))\times(J1-J3)/(J5-J1)]+[(TIR(c5)-TIR(c3))\times(J5-J3)/(J5-J1)]$$

TIR (j#) means TIR of the listed journal number (#) with respect to journals 1 and 5;

TIR (c#) means TIR of the listed journal number (#) with respect to the camshaft center;

J# means the distance from a fixed reference point to the listed journal number (#).

After measurement is complete, the gauge assembly 10 is retracted, and the camshaft 16 is unloaded. The present invention is not limited to the preferred embodiment that has been illustrated and described herein. For example, instead of routing air completely through the arms 30 and 32 and then to the rectangular plate 20, a passage from the inner wall slit 46 that proceeds directly to the outer wall and into a section of tubing that joins other sections of tubing can be used. Also, to reduce the number of gauge assemblies required within the testing setup, the carriages 108 that support the gauges may also move parallel to the length of the camshaft 16. A single gauge assembly 10 may then be used to measure multiple journals, although the overall cycle time for measuring the entire camshaft will increase.

The gauge assembly of the present invention removes the need for separate gauges to measure diameter and runout of a body with a generally cylindrical outer surface. The gauge assembly is easily placed into an operating position, not requiring precision manual alignment. Measurements of diameter of the cylindrical body are not affected by changes in ambient temperature.

Although the invention has been shown and described with reference to certain preferred and alternate embodiments, the invention is not limited to these specific embodiments. Minor variations and insubstantial differences in the various combinations of materials and methods of application may occur to those of ordinary skill in the art while remaining within the scope of the invention as claimed and equivalents.

What is claimed is:

1. A gauge assembly for measuring diameter and runout on a body having a generally cylindrical outer surface comprising:

a first gauge including first and second spaced arms and two air passages for use in measuring diameter of the body;

a structure interconnecting the first gauge and a second gauge, the interconnecting structure including:

a neck portion pivotally attached to the first gauge;

a base, said neck portion being movable relative to said base; and the second gauge secured to the base, the second gauge for measuring relative linear motion between the base and neck portion.

2. The gauge assembly of claim 1, further including means for biasing the first gauge and neck portion away from one another.

3. The gauge assembly of claim 1, further including means for biasing the neck portion and base away from one another.

4. The gauge assembly of claim 1, wherein the second gauge is a linear variable differential transducer.

5. The gauge assembly of claim 1, wherein a pivot bearing facilitates pivotal movement between the neck portion and first gauge.

6. The gauge assembly of claim 1, wherein the two air passages are configured within the first and second arms respectively, and wherein the first gauge further includes a rectangular plate including an air passage in fluid communication with the air passages in the first and second arms.

7. A gauge assembly for measuring diameter and runout on a body having a generally cylindrical outer surface comprising:

an air snap gauge for measuring the diameter of the body;

a structure interconnecting the air snap gauge and a second gauge, the interconnecting structure including:

a base secured to the second gauge;

a neck portion attached to the air snap gauge and slidably movable relative to said base;

wherein the second gauge measures relative movement between the base and the neck portion to determine the runout of the body.

8. A method of measuring diameter and runout of a generally cylindrical object, comprising the steps of:

providing a gauge assembly having:

an air snap gauge for measuring the diameter of the body;

a second gauge for measuring runout;

a structure interconnecting the air snap gauge and the second gauge, the interconnecting structure including:

a base secured to the second gauge;

a neck portion attached to the air snap gauge and slidably movable relative to said base; and the second gauge for measuring relative movement between the base and the neck portion to determine the runout of the body;

placing the air snap gauge assembly around the cylindrical object;

measuring the diameter of the cylindrical object with the air snap gauge; and rotating the cylindrical object at least one full revolution while measuring relative movement between the neck portion and the base with the second gauge to determine runout.

9. The method of claim 8, including the further steps:

rotating the cylindrical object ninety degrees; and measuring diameter a second time.

10. The method of claim 8 wherein rotation of the cylindrical object is performed using a servomotor.

11. The method of claim 8, wherein the cylindrical object is a journal on a camshaft, including the further steps of:

optically scanning a shape of the camshaft and a length of the camshaft;

measuring a porosity of an oil seal journal on the camshaft; and marking the camshaft with an indication that the camshaft has been tested.

12. A system for measuring diameter and runout on several journals of a camshaft including runout of each journal with respect to a center axis of the camshaft and a runout of each journal with respect to one or more other journals on the camshaft, comprising:

a camshaft having a plurality of journals; and a plurality of gauge assemblies, each corresponding to one of the plurality of journals, each gauge assembly comprising:

an air snap gauge for measuring the diameter of the body;

a second gauge for measuring linear movement of the air snap gauge and a base secured to the second gauge and slidingly receiving the air snap gauge.

13. The system for measuring diameter and runout on several journals of a camshaft of claim 12, further comprising a servomotor for rotating the camshaft.

* * * * *